INVENTOR.
WILLIAM HAROLD EDMUNDS

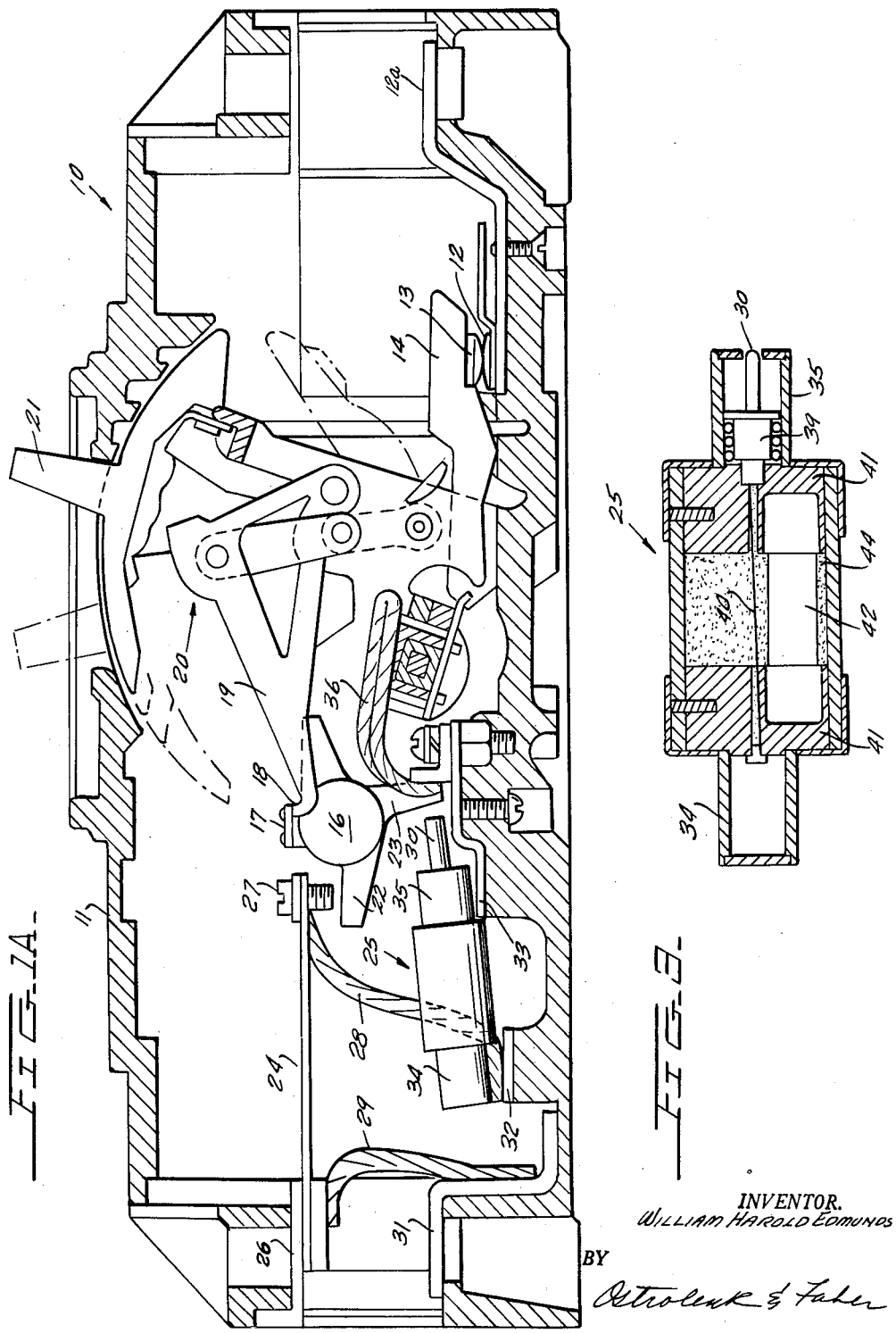

May 1, 1962 W. H. EDMUNDS 3,032,631
CIRCUIT BREAKER HAVING ELECTRICAL AND MECHANICAL
COORDINATION WITH A CURRENT
Filed Oct. 11, 1954 LIMITING DEVICE
4 Sheets-Sheet 3
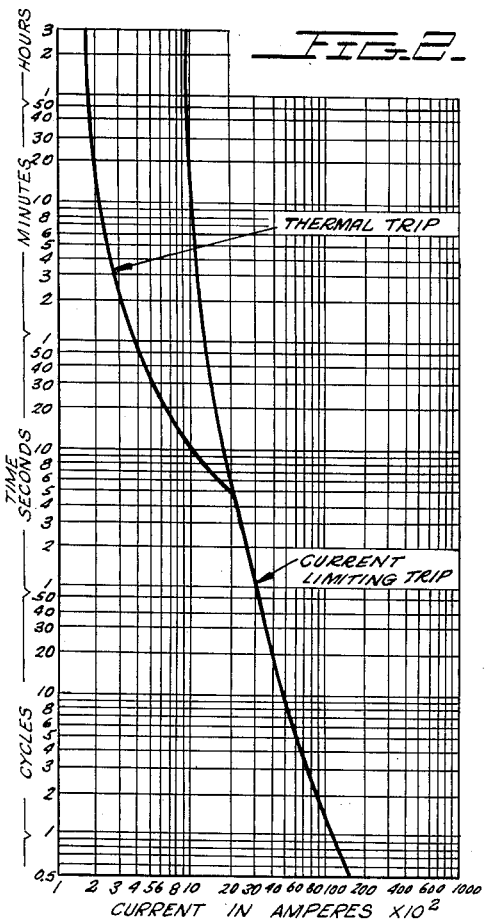
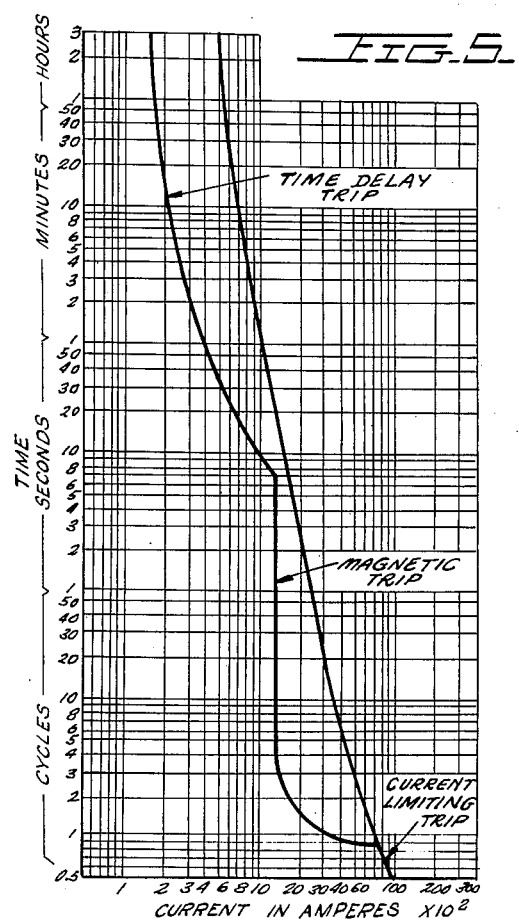
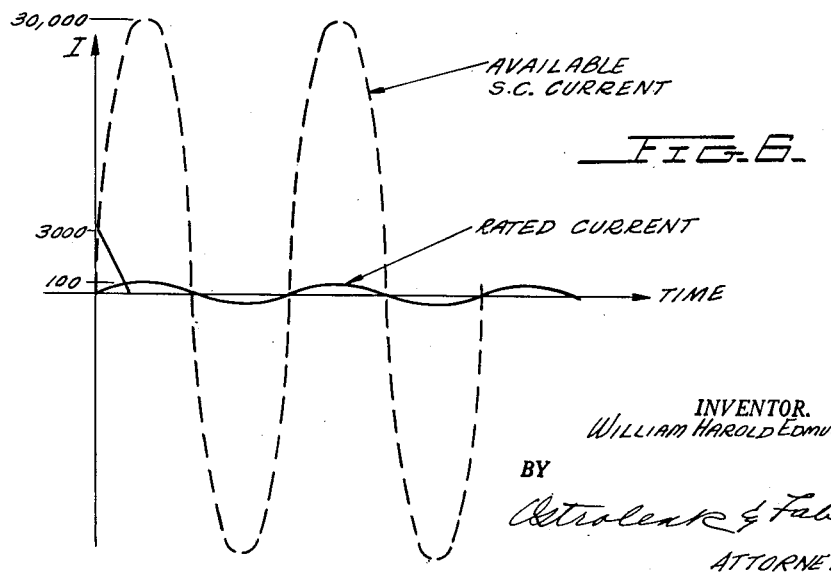
INVENTOR.
WILLIAM HAROLD EDMUNDS
BY
Ostrolenk & Faber
ATTORNEYS

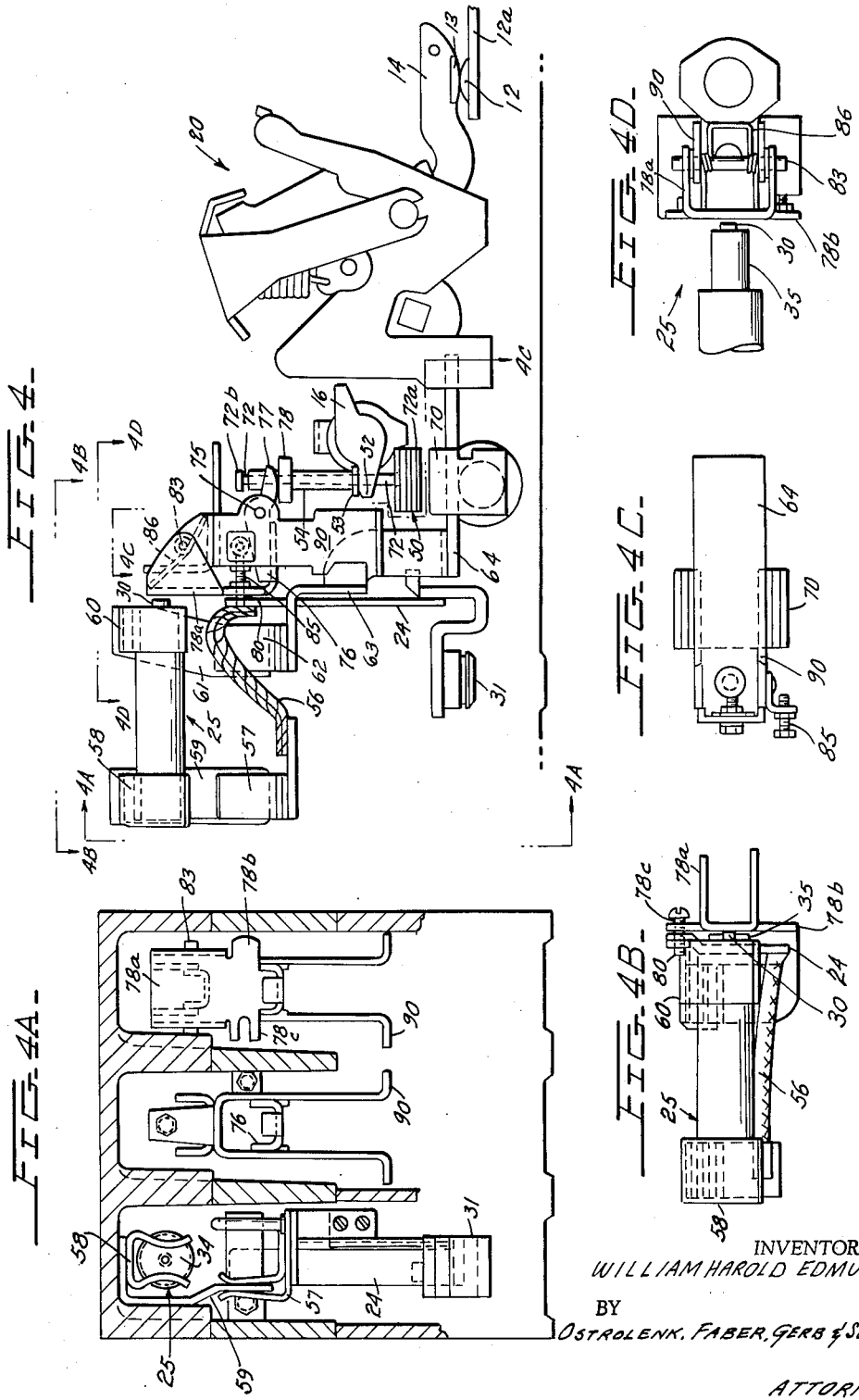

United States Patent Office 3,032,631
Patented May 1, 1962

3,032,631
CIRCUIT BREAKER HAVING ELECTRICAL AND MECHANICAL COORDINATION WITH A CURRENT LIMITING DEVICE
William Harold Edmunds, Havertown, Pa., assignor to I-T-E Circuit Breaker Company, Philadelphia, Pa., a corporation of Pennsylvania
Filed Oct. 11, 1954, Ser. No. 461,378
24 Claims. (Cl. 200—114)

My invention relates to a novel arrangement wherein a current limiting device functions in electrical and mechanical coordination with a circuit breaker to provide for the automatic tripping in all phases of a low voltage, high current multi-phase line on the occurrence of a fault or over-current in any one phase thereby preventing single phase operation.

This application is a continuation-in-part of copending application Serial No. 316,221, filed October 22, 1952, now Patent No. 2,843,702.

In low voltage, high current circuits, all of the conducting components are positioned in relatively close proximity since the dielectric strength requirements is at a minimum in view of the low voltage use. However, the magnetic stresses set up by the flow of the full magnitude of available short-circuit current may mechanically damage the circuit in view of the close proximity of the conducting components.

Thus, in this type of circuit, unless current limiting means are provided, it is necessary to provide sufficient mechanical support in order to withstand the extreme forces which are setup by the flow of available short-circuit current.

It will be noted that these problems do not exist to the same extent in high voltage, low current applications since the various components are usually built at a sufficient distance from each other to provide ample dielectric strength for the high voltage; the available short-circuit current, as a rule, does not set up sufficient magnetic force to mechanically over-stress the circuit or components. In any event, the degree of mechanical support to withstand these mechanical stresses is relatively small in comparison to the low voltage, high current applications.

It is further noted that in modern installations wherein interlocking generating plants and circuits are used, the magnitude of available short-circuit current has been substantially increased thereby increasing both the magnetic and thermal stresses to which the circuit will be subjected.

It is further noted that low voltage, high current circuit protective equipment is usually built in a minimum amount of space and is of the greatest economy. Thus, for example, the gap between the cooperating contacts when the protective device is in the open position is relatively small since the magnitude of voltage which may cause a restriking is relatively small.

In contradistinction, a high voltage, low current protective equipment must provide a relatively large airgap between the cooperating contacts, when the circuit protective device is in the open position, in order to prevent a restriking from high magnitude of voltage which may be applied across the open contacts. This, of necessity, requires a relatively large volume and hence, it is possible to add more copper and conducting material without substantially increasing the size of the breaker.

However, in a low voltage, high current device, a minimum amount of copper is used since the airgap is relatively small and it is desirable to make the unit as small, compact and economical as possible. Thus, in many installations, the high voltage, low current circuit protective equipment is capable of withstanding full available short-circuit currents for several cycles without exceeding the thermal and magnetic stresses of the circuit or circuit protective devices.

For the reasons heretofore noted, the inherent protection which is available in high voltage, low current applications against thermal and magnetic stresses is not available in low voltage, high current applications and hence, if current limiting means are not provided, it is necessary to build in insulation and mechanical support to withstand these extreme stresses. Thus, for the reasons noted, the degree of thermal and magnetic stresses for low voltage, high current application is more critical than for high voltage, low current application.

In addition to these factors, it is noted that in low current, high voltage applications, the magnitude of available short-circuit current may be in tens of thousands amperes. Thus, for example, in a low voltage, high current circuit in which there is 600 volt, 600 ampere load, the magnitude of available short-circuit current may very well exceed 25,000 amperes whereas in a high voltage, low current circuit, as for example in which there is 15,000 volts with a rated current of 1,000 amperes, the available short-circuit current in many instances would not exceed 10,000 amperes.

Thus, a comparison of the representative figures for high and low voltage cases readily indicate that a low voltage, high current circuit will be subjected to considerably greater magnitudes of thermal and magnetic stresses than a high voltage, low current circuit. Thus, it is extremely desirable to provide this type of circuitry with limiting current means to insure that the current flowing through the circuit does not reach the magnitude of available short-circuit current.

Circuit breakers known in the prior art are usually provided with dual trip characteristics wherein a time delay trip element such as a bimetallic device provides for time delay tripping on the occurrence of over-current conditions. The characteristics of the time delay trip unit usually provides inverse time tripping so that a relatively small over-current condition is permitted to flow for a relatively long period of time and a relatively large over-current is only permitted to flow for a relatively short period of time.

However, on the occurrence of short-circuit conditions, it is desirable to have the circuit breaker contacts open without any intentional delay, that is, substantially instantaneously. For this operation, the breaker is usually provided with an instantaneous trip device such as a magnetic member which operates instantaneously on the occurrence of a fault or short-circuit. However, the operation of the instantaneous trip unit does not in itself interrupt the fault current.

The magnetic trip unit must first release a trip latch and thereafter the operating mechanism of the circuit breaker moves the main cooperating contacts from their engaged to their disengaged position. Due to the inertia of the various components comprising the operating mechanism of the circuit interrupter, the period of time between the initial operation of the magnetic trip and the subsequent extinguishment of the arc on the cooperating contacts may be longer than one quarter of a cycle. Hence, the magnitude of fault current which flows through the cooperating contacts of the circuit interrupter may be equal to the available short-circuit current of the circuit. In this type of installation, it is necessary to design the circuit breaker, and primarily its cooperating contacts and arc chute, to have an interrupting capacity which is sufficient to extinguish the full magnitude of available short-circuit current.

With my novel arrangement, I provide a current limiting device which acts in electrical and mechanical coordination with the circuit breaker so that the interrupting capacity requirement of the circuit interrupter need be only a small percentage of the available short-circuit current of the circuit.

The current limiting device which may be used in my invention ruptures within one quarter of a cycle on the occurrence of a fault or short-circuit current so that the magnitude of let-through current represents a relatively small percentage (in some cases only 10%) of the available short-circuit current and also is less than thirty times the magnitude of the rated current of the circuit. This relationship between let-through current, available short circuit current, and rated current, is referred to as current limiting. Devices having this current limiting action are described in United States Patent No. 2,592,399, issued April 8, 1952.

By connecting a current limiting device in series with each pole or phase of the circuit breaker, it is possible to obtain electrical coordination between the two units. However, in the event that a fault or short-circuit should exist between one phase and ground, the rupture of a single current limiting device would result in single phase operation.

In order to avoid this operation, I provide not only electrical but also mechanical coordination between the current limiting device and the circuit breaker. This is achieved by providing the current limiting device with a biased striker pin and positioning same so that the release of the striker pin will impart a hammer blow to a component of the circuit interrupter so that all three phases thereof will be interrupted by the operating mechanism of the circuit interrupter.

More particularly, I have provided an arrangement wherein a current limiter with a striker pin is positioned in such a manner as to release the common trip latch of the circuit interrupter to thereby insure three phase interruption even though the fault may occur in a single phase.

Thus, with my novel arrangement, the circuitry will be protected from over-currents by the operation of time delay trip units which function through the operating mechanism of the circuit breaker to interrupt all three phases of the circuit. In the event a fault current exists wherein the magnitude of current is below the magnitude of severe short-circuit currents but larger in magnitude than mere over-currents, the instantaneous trip of the circuit breaker will operate to interrupt all three phases of the circuit interrupter. That is, when the magnitude of the fault current is substantially below the magnitude of the available short-circuit current which the circuit is capable of delivering. In the event a severe short-circuit current occurs, the current limiting device will rupture thereby resulting in an immediate circuit interruption wherein the magnitude of let-through current will be a small percentage of the available short-circuit current and will also be less than thirty times the magnitude of the rated current of the circuit.

It should be noted that the interruption will occur within the current limiting device. However, the striker pin of the current limiting device will impart a hammer blow, for example, to the common tripper bar of the circuit breaker to thereby subsequently result in the opening of all three phases of the circuit breaker.

Thus, it will be noted that with my novel arrangement, the interrupting capacity requirement of the protective equipment does not have to be equal to the magnitude of the available short-circuit current of the circuit thereby substantially reducing the size and cost of the protective equipment.

It will be noted that my novel arrangement of a circuit breaker having electrical and mechanical coordination with a current limiting device will have two primary applications in electrical circuitry. The first typical application to which my novel arrangement is adaptable is in the circuit which was originally designed with a predetermined available short-circuit current in which the various loads and components were constructed so that the thermal and magnetic stresses created by the short-circuit current would not damage same during the short interval of time that these currents were permitted to flow by the circuit breaker.

However, as it is well known, many electrical circuits although they were initially properly designed have throughout the years been dangerously overloaded so that the magnitude of available short-circuit current in many cases both exceeds the interrupting capacity of the circuit interrupter and also exceeds the thermal and magnetic stress limits of the components and loads in the circuit.

In this type of situation, it is extremely difficult to eliminate the dangerous conditions which exist as a result of the overloading. That is, even though the existing circuit interrupter can be replaced by a circuit interrupter having a larger interrupting capacity, it nevertheless will not solve all of the problems. That is, since the circuit breaker, per se, does not have current limiting features, it is possible that the larger available short-circuit current will exceed both the maximum thermal and magnetic stresses of the components and load of the circuit if the current is allowed to flow for more than a quarter of a cycle.

There are only two ways to remedy the dangerous conditions; (a) by completely replacing all of the components and loads with new units which are capable of withstanding these severe thermal and magnetic stresses which will be set up by the larger available short-circuit current of the circuit, or (b) replacing the old circuit protective equipment with apparatus which will prevent the short-circuit current from reaching its available short-circuit current magnitude.

It is apparent that solution a is a very costly solution to the problem although, heretofore, it has been the only means to solve the problem.

However, with my novel apparatus, it is now possible to provide complete protection for old circuits which are overloaded.

With my novel circuit breaker-current limiting device combination, it is possible to coordinate the time delay trip, the magnetic instantaneous trip and the current limiting device so that for all magnitudes of over-current and fault current which do not exceed the thermal and magnetic stresses of the components and load, one of the first two mentioned trip means will function.

In the event a severe short-circuit occurs so that the available short-circuit current magnitude would exceed either or both the thermal and magnetic stresses of the components and load, if the current were allowed to flow for more than a quarter of a cycle, then the current limiting device will rupture so that the let-through current will not over-stress the circuit.

Thus, with the novel combination whereby electrical-mechanical coordination is achieved between the circuit breaker mechanism and current limiting devices, it is necessary to increase the interrupting capacity requirements of the circuit breaker, per se. That is, since the current limiting device will rupture and interrupt severe short-circuit current in the particular phase in which same exists, the burden of interruption is upon the current limiting device. However, since the current limiter plunger will be released to thereby operate the circuit breaker, the main cooperating contacts of the circuit breaker need only open on either zero current, rated current, or, at most, a mere over-current. In any event, the interruption of the severe short-circuit current is handled by the current limiter and thereafter, the operation of the circuit breaker functions to prevent single phasing and also has a disconnecting means ahead of the current limiter so that same can be replaced.

It should here be noted that for all magnitudes of current below severe short-circuit current magnitudes, the circuit breaker will operate in its normal manner. However, for current magnitudes above severe short-circuit currents, the current limiting device will initially operate and serve to interrupt the short-circuit current in the phase associated therewith and will then release its striker pin to effect operation of the circuit breaker so that single phasing operation will be prevented and automatically provide a disconnection ahead of the current limiter.

My novel invention is not only useful when used as a protective device for old over-loaded circuits but also finds application for new circuits which are specifically designed for this type of circuit protection.

Heretofore, it has always been necessary to design components and load of electrical circuitry so that they could withstand both the magnetic and thermal stresses which would be created by the available short-circuit current of the circuitry. However, as has heretofore been noted, my novel circuit breaker-current limiting device combination insures that the magnitude of the let-through current is a small percentage of the available short-circuit current. Hence, it is not necessary to provide the additional support ventilation and insulation for the components and load of the circuit to withstand the thermal and magnetic stresses which would be set up by the available short-circuit current since my novel combination prevents the current from ever reaching this magnitude. As a result thereof, an economical design can be provided for the circuitry since it does not have to withstand the excessive current which the circuitry escape would ordinarily be capable of delivering.

Furthermore, the circuit breaker, per se, in view of its electrical-mechanical coordination with the current limiter, does not have to have an interrupting capacity equal to the magnitude of the available short-circuit current which the circuit is capable of delivering. Thus, there is a considerable economical saving on both the components, load, and circuit protective equipment when the circuit is designed with my novel protective equipment.

It will be noted that the circuit protective equipment of my invention has advantages in addition to those heretofore noted. For example, when the circuit has been interrupted as a result of the rupture of a current limiting device, the striker pin of the current limiting device will prevent reclosing of the operating mechanism until the current limiting device has been replaced and the fault removed from the circuit. That is, since the striker pin is still interposed in the path of the tripper bar of the circuit breaker, the mechanism can not be latched closed until a new current limiting device is inserted in the circuit. Furthermore, in the event the fault continues to exist when the circuit breaker is reclosed following the replacement of the current limiting device, the circuit breaker will have trip-free characteristics since the current limiter will again rupture thereby driving its striker pin forward to initiate a second opening operation.

The striker pin of the current limiting device will not only serve to mechanically initiate the operation of the circuit breaker but will also serve as an indicating device. That is, the operator, by visual inspection, will immediately be able to determine whether or not a current limiting device must be replaced following a circuit interruption by observing the position of the striker pin.

Accordingly, an object of my invention is to provide a current limiting device and a circuit breaker having electrical and mechanical coordination so that a severe short-circuit current in one phase will initially be interrupted by the current limiting device and subsequently all three poles of the circuit breaker will be opened due to the mechanical coordination between the two circuit protective units.

Another object of my invention is to provide a novel arrangement wherein a current limiting device relieves the circuit breaker of interrupting capacity requirements equal to that of the available short-circuit current which the circuitry is capable of delivering.

Another object of my invention is to provide a novel circuit protective device wherein the magnitude of let-through current may be only 10% of the available short-circuit current and also where the let-through current may be less than thirty times the magnitude of rated current when the circuit is subjected to a fault comparable to a severe short-circuit.

Another object of my present invention is the provision of means whereby the plunger on a current limiting device is released when the fusible link ruptures so that all poles of the circuit breaker are simultaneously open to prevent single phase operation.

These and other objects of my invention will be apparent from the following description when taken in connection with the drawings in which:

FIGURE 1a is a cross-sectional side view of the circuit breaker of FIGURE 1 and illustrates the operating components thereof.

FIGURE 2 is a time versus current characteristic curve for the novel combination of FIGURES 1 and 1a.

FIGURE 3 is a cross-sectional view of the current limiting device and striker pin thereof which may be used in my novel arrangement.

FIGURE 4 is a side cross-sectional view of a circuit breaker having electrical and mechanical coordination with a current limiting device. In the arrangement of FIGURE 4, I have shown a circuit breaker having both time delay and magnetic trip as well as a current limiting means.

FIGURE 4a is a partial end view of the circuit breaker of FIGURE 4 taken in the direction of the arrows 4a—4a.

FIGURE 4b is a top view taken in the direction of the arrows 4b—4b of FIGURE 4.

FIGURE 4c is a top view taken in the direction of the arrows 4c—4c of FIGURE 4.

FIGURE 4d is a top view taken in the direction of the arrows 4d—4d of FIGURE 4.

FIGURE 5 is a time versus current characteristic curve of the circuit breaker of FIGURE 4 showing the electrical coordination between the current limiting device and the circuit breaker.

FIGURE 6 is a current versus time representation of the rated current, available short-circuit current and the let-through current of a typical circuit to which my novel apparatus may be applied.

Figure 1:
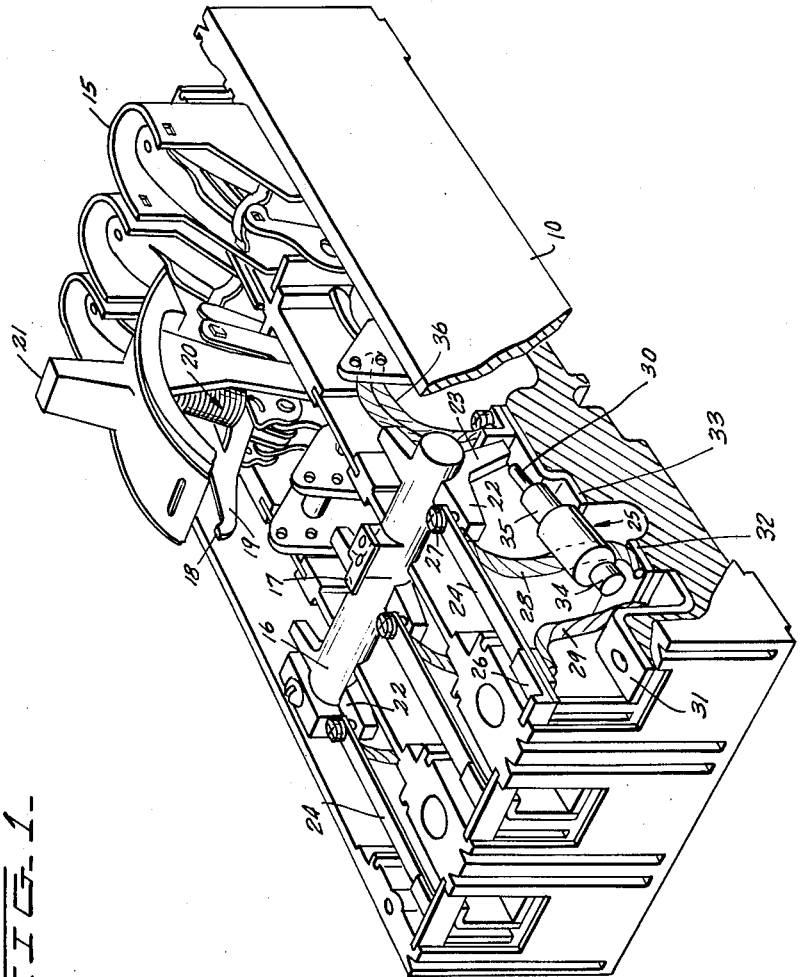
FIGURE 1 is a perspective view of a three pole circuit breaker incorporating a current limiting device for electrical and mechanical coordination therewith. The embodiment of FIGURE 1 illustrates the mechanical arrangement whereby time delay trip can be coordinated with a current limiting device.

Referring to FIGURES 1 and 1a, I have shown a circuit breaker having mechanical coordination with a current limiting device. The operating mechanism of the circuit breaker per se may be the same as in circuit breakers which are now well known in the art. By way of example, I have illustrated a molded case circuit breaker of the type shown in my Patent 2,574,093, issued November 6, 1951.

The current limiting device which is used in coordination with the circuit breaker may be of the type shown in United States Patent 2,592,399, issued April 8, 1952, and operate on the principles noted therein. However, as will hereinafter be more fully explained, the current limiting device used in my invention is provided with a striker pin so that mechanical coordination between the two pieces of circuit protective equipment can be achieved.

Referring further to FIGURES 1 and 1a, the operating mechanism of the circuit breaker and of the current limiting device are contained within the molded case housing 10, which has a cover 11. The circuit breaker is provided with a pair of cooperating contacts 12 and 13. The stationary contact 12 is connected to the terminal 12a and a movable contact 13 is connected to the movable contact arm 14. An arc chute 15 is provided for each pole to aid in extinguishing the arc created by the the cooperating contacts 12 and 13 when these contacts are moved to the disengaged position.

The circuit breaker has a common tripper bar 16 on which a portion of the prop latch 17 is mounted. The prop latch 17 engages the latch surface 18 of the member 19 which is controlled by the operating mechanism 20 of the circuit breaker. When the latch surface 18 is positioned under the latch 17 and the handle 21 moved to the extreme right, as illustrated in FIGURE 1a, the cooperating contacts 12 and 13 are moved to their engaged position. However, if the tripper bar 16 is rotated in a counterclockwise direction, the prop latch 17—18 will be released and hence, the operating mechanisms 20 will move the cooperating contacts 12—13 to the disengaged position in a manner which is well known in the art.

The tripper bar 16 is provided with a protrusion 22 and 23 for each pole of the circuit breaker. The protrusion 22, as will hereinafter be more fully explained, is for the purpose of tripping the circuit breaker by means of a time delay means 24 and the protrusion 23 is for the purpose of tripping the circuit breaker by means of current limiting device 25. The time delay means 24 is comprised of a bimetallic element which is rigidly secured at at its left end 26 and has a calibration screw 27 secured at its right end.

The pigtail 29 connected to the left hand stationary end of the bimetal 24 is also connected to the terminal 31 and the pigtail 28 near the adjustment screw 27 is electrically connected to the terminal 32 which forms one terminal clip for the current limiting device 25.

On the occurrence of an over-current condition, the bimetal element 24 is deflected downwardly so that the calibration screw 27 will engage the protrusion 22 of the common tripper bar 16 thereby rotating this member in a counterclockwise direction to release the latch 17—18 thereby resulting in the disengagement of the cooperating contacts 12—13 due to the operation of the operating mechanism 20.

The protrusion 23, as noted, is provided for the current limiting device 25. That is, on the occurrence of a severe short-circuit current, the current limiting device 25 will rupture thereby releasing its striker pin 30 so that same will be driven forward to engage the protrusion 23. This will rotate the common tripper bar 16 in a counterclockwise direction to release the latch 17—18 so that the cooperating contacts 12—13 will be driven to their disengaged position.

The current limiting device may be positioned within the circuit breaker in any desirable manner as for example by means of clips which are connected to the terminals 32—33 to engage terminals 34—35 of the current limiting device. Thus, the complete electrical circuit for the circuit protective equipment is as follows: from the terminal 12a, through the stationary contact 12, the movable contact 13, the movable contact arm 14, the pigtail 36, stationary terminal 33, current limiting terminal 35, through the current limiter 25 to the current limiting terminal 34, stationary terminal 32, through the pigtail 28, time delay trip 24, through 26, pigtail 29 to the terminal 31 of the circuit interrupter.

The current limiting device 25 is provided with a striker pin 30 which is biased to the right by means of spring 39, as best seen in FIGURE 3. However, the thin wire 40 prevents the spring 39 from driving the striker pin 30 forward. The circuit interrupter 25 is provided internally with terminal blocks 41 which secure the inner units 42. The inner units 42 are constructed in substantially the same manner as shown in United States Patent 2,592,399, issued April 8, 1952, wherein a reduced cross-sectional fusible element is surrounded by quartz crystal so that the rupture of the fusible element will result in a melting of the quartz crystal permitting same to flow between the gap created by the rupture to result in extremely rapid interruption of the arc.

This particular device will operate within less than ¼ of a cycle so that the let-through current is less than 10% of the available short-circuit current and still not more than thirty times the magnitude of the rated current.

As seen in FIGURE 3, the inner unit 42 which contains the main portion of the current limiting device is connected in electrical parallel with the thin wire 40. A quartz filler 44 surrounds both the inner unit 42 and the thin wire 40. Following the rupture of the inner unit 42, all of the current will be diverted to the thin wire 40. Due to the small cross-sectional area of the wire 40, it will rupture substantially instantaneously thereby enabling the spring 39 to release its energy to drive the striker pin 30 forward.

As heretofore noted, the forward movement of the striker pin 30 will result in engagement with the protrusion 23 of the tripper bar 16 so that the latch 17—18 will be released thereby moving the cooperating contacts 12—13 to their disengaged position. The manner in which the time delay unit 24 electrically coordinates with the current limiting device 25 is illustrated in the time versus current characteristic curve of FIGURE 2. Thus, for example, by way of illustration, it is assumed that the circuit protective device of FIGURES 1 and 1a is designed to have a rated current of 100 amperes on an A.-C. line. For over-currents, as best seen in FIGURE 2, between the range of 200 amperes and 2,000 amperes, the time delay device 24 will be more rapid in operation than the current limiting device 25. Thus, by way of example, when the current reaches a magnitude of 1,000 amperes, the time delay device 24 will operate in approximately 8 seconds.

However, as noted, the current limiting device 25 would ordinarily take 8 minutes to operate under this magnitude of over-current. Thus, during the range of over-current from 100 to 2,000 amperes, the time delay device 24 will be more rapid than the current limiting device 25 and hence, the bimetal will deflect to engage its respective protrusion 22 of the common tripper bar 16 to release the latch 17—18. However, for fault currents and short-circuit currents above 2,000 amperes, the current limiting device will be more rapid than the time delay device 24 and hence, the fusible element in the current limiting device 25 will rupture. That is, the interruption will occur within the current limiting device 25. However, as heretofore noted, a rupture of the current limiting device 25 will result in all of the current initially being diverted to the wire 40 so that this unit will rupture without time delay.

The breaking of the wire 40 will release the stored energy in the biasing spring 39 to thereby drive the striker pin 30 upward to engage the respective protrusion 23 of the common tripper bar 16 to effect release of the latch 17—18 so that all of the cooperating contacts 12—13 will be moved to their disengaged position. That is, even though a severe short-circuit may exist on only one pole of a multi-phase line, the current limiting device associated with that pole will initially rupture. However, after same has ruptured, the mechanical coordination between this unit and the circuit breaker will result in the opening of all three poles of the circuit breaker.

Since the main interruption has occurred within the current limiting device 25, the interrupting capacity requirements of the cooperating contacts 12—13 of the circuit breaker is substantially reduced since these contacts will only have to open on either zero current, rated current, or, at most, a mere over-current condition.

In the current versus time curve of FIGURE 6, I have illustrated the manner in which the current limiting device limits the magnitude of the let-through current to a relatively small percentage of the available short-circuit current. Thus, for example, assuming that the rated current of the circuit is 100 amperes, the circuit may be capable of delivering a short-circuit current of 30,000 amperes. However, since the current limiting device 34 operates within the first quarter of a cycle, the magnitude of let-through current may be only 10% of the available short-circuit current and less than thirty times the magnitude of the rated current. Thus, the components and load of the circuitry will not be subjected to these severe thermal magnetic stresses which would ordinarily have been set up by the large magnitude of available short-circuit current but instead will only be subjected to the relatively small thermal magnetic stresses which are caused by the small magnitude of let-through current.

In the embodiment of FIGURES 1 and 1a, I have shown a circuit breaker having only a time delay trip connected in electrical mechanical coordination with a current limiting device. However, in many applications, It will be desirable to provide the circuit breaker with both a time delay and an instantaneous trip as well as a current limiting device.

I have shown this combination in the embodiment illustrated in FIGURES 4, 4a, 4b, 4c and 4d, and the characteristic curve for this combination is illustrated in FIGURE 5. That is, as seen in FIGURE 4, the circuit breaker is provided with a thermal trip 24 and a magnetic trip indicated generally at the numeral 50.

These two units, as will hereinafter be more fully explained in connection with the characteristic curves of FIGURE 5, coordinate with the current limiting device 25. In the embodiment of FIGURE 4, I have shown only the operation and trip mechanism of the circuit breaker.

It will be noted that the non-illustrated components of the circuit breaker, such as the arc chute molded housing etc., may be of standard construction such as is well known in the art.

Furthermore, the operating mechanism 20 is similar to that known in the art.

With regard to the trip mechanism, I have illustrated a spring trip type of an arrangement similar to that illustrated and described in my United States Patent 2,574,-093, issued November 6, 1951, but have modified same so that mechanical coordination with the current limiting device 25 may be achieved. Thus, the circuit breaker is provided with a common tripper bar 16 which is provided with a protrusion 52 which will be engaged by the collar 53 of the hollow sleeve 54.

As will hereinafter be more fully explained, on the occurrence of either an over-current, a fault current, or a short-circuit current, the cylindrical sleeve 54 will be moved downwardly thereby forcing the collar 53 against the protrusion 52 to rotate the common tripper bar 16 in a counterclockwise direction to thereby release the prop latch and enable the operating mechanism 20 to move the cooperating contacts 12—13 from engaged to disengaged position.

It will be apparent that in the illustration of FIGURE 4, I have shown only one pole of the multi-pole circuit breaker. However, the operating mechanism 20 may be common to all three poles of the circuit breaker substantially in the same manner as illustrated in FIGURE 1. However, the trip mechanism comprised of the time delay trip 24 and the instantaneous trip 50 as well as the current limiting device 25 will be duplicated for each pole of the circuit breaker.

The various components of the circuit breaker are as follows. A terminal 31 represents means by which the circuit protective equipment is connected to the external circuit. The stationary end of the bimetal 24 is secured to the terminal 31. The flexible end of the bimetal 24 has a pigtail 56 secured thereto and the opposite end of the pigtail 56 is connected to the stationary disconnect contact 57.

The disconnect contact 57 receives the movable male contact 59 as shown in detail in FIGURE 4a. The opposite end of the contact 59 is secured to the clip terminal 58. The clip terminal 58 is provided to receive the terminal 34 of the current limiting device 25. The opposite terminal 35 of the current limiting device is positioned within the clip means 60 which is also provided with a male disconnect contact 61 which engages the stationary disconnect contacts 62.

The stationary disconnect contacts 62 are electrically connected by means of conductor 63 to the conductor 64 which forms a turn for the magnetic trip 50. The conductor 64 is electrically connected to the movable contact arm 14. Thus, the complete electrical circuit through the circuit interrupter is from the stationary contact 12 to the movable contact 13 through the movable contact arm 14, the conductor 64, the conductor 63, the stationary disconnect contact 62, the male disconnect contact 61, clip means 60, terminal 35, the current limiting device 25, terminal 34, clip means 58 to the male disconnect contact 59, the stationary disconnect contact 57, through pigtail 56, bimetal 24 and thence, to the terminal 31.

The instantaneous trip is provided with a magnetic core 70 which is energized by the single turn 64. When the magnetic core 70 is sufficiently energized, the armature 72a is pulled downwardly.

The construction and operation of the instantaneous trip 50 is substantially as illustrated and described in the heretofore mentioned United States Patent 2,574,093 assigned to the assignee of the instant application. That is, the armature 72a is secured to a thin stem member 72 which has nut 72b in threaded engagement at its opposite end. A hollow member 54, with a collar 53 at one end and an adjustment nut 78 threadably engaged near the other end is positioned concentric on the thin stem member 72. Thus, when the armature 72a is pulled downwardly, the nut 72b engages the end of the hollow member 54 to thereby urge this latter member downwardly. This results in the engagement of the collar 53 with the protrusion 52 of the common tripper bar 16 to thereby release the trip latch to result in the disengagement of cooperating contacts 12—13.

With regard to the time delay trip, I have shown spring trip means for opening the circuit breaker. That is, in the embodiment of FIGURES 1 and 1a, I have shown an arrangement wherein the bimetallic element 24 operates directly on the tripper bar. However, in the arrangement of FIGURE 4, I have shown an arrangement in which the embodiment of the bimetal releases an initial latch so that the stored energy may be released from a spring to thereby rotate the common tripper bar 16 so as to release the prop latch.

This arrangement is as follows. A stationary pivot 75 on support member 90 is provided for the latch lever 76. Spring means (not shown) are provided to bias the latch lever 76 in a clockwise direction so that its extension 77 will urge the collar 78 and the hollow cylindrical member 54 downwardly against the extension 52 to thereby rotate the common tripper bar 16. However, the member 76 is latched in its extreme counterclockwise position by the latch means 78a. Thus, due to the latch means 78a, the pivot member 76 will not be rotated clockwise by its spring. However, the bimetallic element 24 is provided with a trip screw 80 (as seen in FIGURE 4b) which extends through the section 78c of latch means 78a.

The latch means 78a is pivotally mounted at pivot 83 on the stationary member 90 and has two extensions 78b and 78c.

Adjustment of the trip screw 80 provides calibration for the automatic current limiting device. Thus, on the occurrence of an over-current, the upper portion of the bimetallic element 24 will deflect to the left thereby pulling the screw 80 to the left, until the head thereof engages the sections 78c of latch means 78a to rotate same clockwise around its stationary pivot 83.

Hence, the latch engagement with the latch lever 76 will be released so that the biasing means can drive this unit in a clockwise direction around its pivot 75. In so doing, the protrusion 77 of the member 76 will drive the collar 78 downwardly thereby resulting in the engagement of the collar 53 with the protrusion 52 so that the common tripper bar 16 will be rotated in a counterclockwise direction to result in the disengagement of the cooperating contacts 12—13.

It will be noted than an adjustment screw 85, mounted on stationary member 90, is provided to adjust the latch bite. That is, the trip unit lever 78a has a return spring 86 which biases same in a counterclockwise direction. However, the adjustment screw 85 which engages the section 78b of latch means 78a limits the extreme counterclockwise rotation of this member so that the latch bite between the trip unit lever 78a and the lever 76 can be adjusted by means of the screw 85.

As has heretofore been noted, the cooperating contacts 12—13 can be opened by the clockwise rotation of the trip unit lever 78a. However, in the preceding paragraph, I have noted that the trip unit lever 78a is rotated in a counterclockwise direction by means of the bimetallic element 24. However, by the mechanical coordination with the current limiting device 25 provided in my novel combination, it is possible to rotate the trip unit lever 78a in a clockwise direction by means of the striker pin 30 of the current limiting device 25.

The current limiting device 25 is positioned to engage a portion of the trip unit lever 78a. Thus, when the current limiting device 25 ruptures, the striker pin 30 will be urged to the right thereby bringing its striker pin 30 into engagement with the trip means 78a so as to rotate this member around its stationary pivot 83 and release the latch engagement with the latch lever 76. When this occurs, a spring will rotate the latch lever 76 in a clockwise direction to thereby bring the collar 53 against the extension 52 of the common tripper bar 16 and hence, result in the disengagement of the cooperating contacts 12–13.

Thus, it will be noted that in the event a mere over-current or fault current occurs, either the time delay trip 24 or the instantaneous trip 50 will function to rotate the tripper bar 16 to disengage the cooperating contacts 12—13. Following the removal of the fault and the cooling of the bimetal 24, the circuit breaker can be reclosed. It will be noted that with this type of operation, the current limiting device 25 does not function. However, in the event a severe short-circuit should occur, the current limiting device 25 will operate before the time delay trip 24 or the instantaenous trip 50 has an opportunity to function and hence, initial circuit interruption will occur within the current limiting device 25 which is constructed as noted in FIGURE 3 and as described in United States Patent 2,592,399, issued April 8, 1952.

As has heretofore been noted, the current limiting device 25 will not permit the full magnitude of available short-circuit current to flow through the circuit so that the let-through current of the amp-trap will only be a small percent as for example 10% of the available short-circuit current, as illustrated in FIGURE 6.

The characteristics for the combination of the circuit breaker of FIGURE 4 is illustrated in FIGURE 5. Thus, for example, it is assumed that the circuit breaker trip shown is capable of carrying a rated current of 100 amperes. Thus, in the range from 100 amperes to approximately 1,300 amperes, the bimetallic element 24 will operate to thereby result in the release of the latch 78a—76 so that the circuit breaker contacts 12—13 will be opened.

However, if the fault short-circuit current should be more than a mere over-current, as for example between 1,300 amperes and 7,000 amperes, then the magnetic trip 70 will function to open the breaker. However, for severe short-circuit currents, as for example between the range of 7,000 amperes and above, the current limiting device 25 will operate before the remaining components to interrupt the circuit. That is, the interruption will initially occur within the current limiting device 25.

The rupture of the fusible element 42 in the current limiting device 25 will release the stored energy in the biasing spring 39 to thereby drive the striker pin 30 forward. Hence, the striker pin 30 will engage the tripping unit 78a to drive same in a clockwise direction around its stationary pivot 83 to release the latch 78a—76 so that the spring means can drive the trip unit lever 76 clockwise to trip the circuit breaker open. Thus, the interruption of the short-circuit current is taken care of by the current limiting device 25 and thereafter, the cooperating contacts 12—13 of the circuit breaker are opened on either zero current, rated current, or, at most, a mere over-current.

Thus, it will be noted that with the novel electrical and mechanical coordination between a current limiting device and a multi-pole circuit breaker, it is possible to permit the circuit breaker to operate in its normal manner for all magnitudes of over-current and fault currents below a predetermined short-circuit value. However, on the occurrence of severe short-circuit, the current limiting device will rupture to interrupt the phase of the circuit in which the fault occurred.

The current limiting device functions, however, in a dual capacity. That is, it serves first to completely interrupt the circuit and does so within the first quarter of a cycle so that the magnitude of let-through current is a small percentage of the available short-circuit current. Secondarily, the current limiting device functions as a tripping unit so that as soon as it ruptures, its striker pin will rotate the common tripper bar of the circuit breaker so that all three poles thereof are opened.

It will be noted that in the arrangement which I have shown, the current limiting device 25 is removable and replaceable so that following the rupture of the device, same may be replaced by a new unit.

Furthermore, since the striker pin 30 is biased forward following rupture of the current limiting device, the circuit breaker will not be able to be reclosed until the current limiting device is replaced and the fault removed from the circuit.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a low voltage, high current multipole circuit interrupter comprised of a plurality of poles each of which has a pair of cooperating contacts with an engaged and disengaged position and a current limiting device; an operating mechanism for simultaneously operating said plurality of pairs of cooperating contacts from said engaged position to said disengaged position; each of said plurality of poles also having a time delay and magnetic trip means connected in electrical series with said cooperating contacts and said current limiting device; said current limiting device electrically and mechanically associated with each pole of said circuit breaker; each of said current limiting devices having a spring biased striker pin normally held in inoperative position; said time delay trip means effective to initiate opening operation of all pairs of said cooperating contacts on the occurrence of an over-current below a first predetermined magnitude; said magnetic trip means effective to initiate opening operation of all pairs of said cooperating contacts on the occurrence of a fault current above said first predetermined current magnitude and below a second predetermined current magnitude; said current limiting device effective to interrupt short-circuit currents above said second predetermined magnitude; said striker pin of said current limiting device rendered operative on the occurrence of a short-circuit above said predetermined magnitude to initiate simultaneous opening of all pairs of said cooperating contacts; said plurality of cooperating contacts, said operating mechanism, said time delay trip means, said magnetic trip means and said current limiting device all being contained within a common molded case enclosure to thereby form a complete circuit interrupter.

2. A low voltage, high current circuit protective device for a circuit design for maximum thermal and magnetic stresses below the magnitude of the available short-circuit current of said circuit; said protective device having three poles each of which is comprised of a current limiting device, a first and second trip unit, a pair of cooperating contacts with an engaged and disengaged position; an operating mechanism to simultaneously operate said pairs of cooperative contacts; said first trip means operative to initiate trip operation through said operating mechanism on the occurrence of a fault current below a first predetermined magnitude; said second trip unit operative to initiate trip operation through said operating mechanism on the occurrence of a fault current above said first predetermined value and below a second predetermined value, said current limiting device effective to interrupt current magnitudes above said second predetermined current magnitude; said current limiting device having a spring biased striker pin to initiate circuit interruption by said pair of cooperating contacts; said striker pin operatively positioned to operate said operating mechanism on the occurrence of a fault current above said first predetermined current magnitude; said cooperating contacts, said operating mechanism, said first trip means, said second trip means and said current limiting device all contained within a molded case enclosure to thereby form a unitary circuit protective device.

3. In a circuit interrupter for low voltage, high current application having a plurality of poles each of which has a pair of cooperating contacts with an engaged and disengaged position; an operating mechanism for simultaneously operating said plurality of pairs of cooperating contacts from said engaged position to said disengaged position; said circuit interrupter having a time delay and magnetic trip means associated with each of said poles; a current limiting device electrically and mechanically associated with each pole of said circuit interrupter; each of said current limiting devices having a spring biased striker pin normally held in inoperative position; said time delay trip means effective to initiate opening operation of all pairs of said cooperating contacts on the occurrence of an over-current below a first predetermined magnitude; said magnetic trip means effective to initiate opening operation of all pairs of said cooperating contacts on the occurrence of a fault current above said first predetermined current magnitude and below a second predetermined current magnitude; said current limiting device effective to interrupt short-circuit currents above said second predetermined magnitude; said striker pin of said current limiting device rendered operative on the occurrence of a short-circuit above said predetermined magnitude to initiate simultaneous opening of all pairs of said cooperating contacts; said plurality of cooperating contacts, said operating mechanism, said time delay trip means, said magnetic trip means and said current limiting device all being contained within a common molded case enclosure to thereby form a complete circuit interrupter.

4. In a circuit interrupter comprised of a plurality of poles each of which has a pair of cooperating contacts with an engaged and disengaged position; an operating mechanism for simultaneously operating said plurality of pairs of cooperating contacts from said engaged position to said disengaged position; said circuit breaker interrupter having a time delay and magnetic trip means associated with each of said poles; a current limiting device electrically and mechanically associated with each pole of said circuit interrupter; each of said current limiting devices having a spring biased striker pin normally held in inoperative position; said time delay trip means effective to initiate opening operation of said circuit interrupter on the occurrence of an over-current below a first predetermined magnitude; said magnetic trip means effective to initiate opening operation of said circuit interrupter on the occurrence of a fault current above said first predetermined current magnitude and below a second predetermined current magnitude; said current limiting device effective to interrupt short-circuit currents above said second predetermined magnitude; said striker pin of said current limiting device rendered operative on the occurrence of a short-circuit above said second predetermined magnitude to initiate simultaneous opening of all poles of said circuit breaker interrupter, said circuit interrupter having a tripper bar common to all poles to control the operation of said operating mechanism; spring means controlling the operation of said tripper bar; said magnetic trip means operative directly on said tripper bar; said time delay trip means and said current limiting device operative on said spring means to thereby control said tripper bar.

5. A low voltage high current multiple pole circuit protective device comprised of pairs of cooperating contacts current limiting devices, time delay bimetallic trip units, and instantaneous magnetic trip units operating mechanism for simultaneous operation to snap open and snap close said cooperating contacts of said circuit protective device; one of said current limiting devices, time delay bimetallic trip elements, instantaneous magnetic trip elements and pair of cooperating contacts being positioned in each pole of said protective device and connected in electrical series with each other; said time delay bimetallic trip units, said instantaneous magnetic trip units and said current limiting devices operatively positioned and operatively connected to said operating mechanism to effect simultaneous snap open operation of said pair of cooperating contacts; said trip units and said current limiting devices being electrically coordinated wherein said time delay bimetallic trip unit is operative for current values above load current and below a first predetermined value, said instantaneous magnetic trip unit is operative for current values above said first predetermined value and below a second predetermined current value and said current limiting device operative for current values above said second predetermined current values, said current limiting device constructed to interrupt current values above said second predetermined value and mechanically coordinate with said operating mechanism; said time delay trip units and said current limiting devices operative through spring means to control a tripper bar associated with said operating mechanisms for simultaneous operation of said pairs of cooperating contacts, said magnetic trip elements being operatively connected directly to said tripper bar for simultaneous operation of said pairs of said cooperating contacts.

6. A low voltage, high current molded case multiple circuit protective device for protecting a circuit on the occurrence of all magnitudes of fault current and preventing the full magnitude of available short-circuit current from flowing in said circuit; each pole of said protective device being comprised of series connected time delay trip unit, instantaneous trip unit, current limiting device and a pair of cooperating contacts; an arc chute associated with each pair of cooperating contacts; operating means for simultaneously controlling all pairs of cooperating contacts for snap open and snap close operation; said trip units and said current limiting devices mechanically coordinated to operate said operating means; said current limiting device having a cross-over point with respect to said instantaneous trip unit whereby currents above said cross-over value are limited and interrupted by said current limiting device; said operating means being controlled by a common tripper bar; a spring means to control said tripper bar; said time delay trip unit and said current limiting devices operatively connected to said spring means to effect simultaneous opening of said pairs of cooperating contacts; said instantaneous trip unit connected directly to said tripper bar to effect simultaneous opening of said pairs of cooperating contacts.

7. A low voltage, high current molded case multipole circuit protective device for protecting a circuit on the occurrence of all magnitudes of fault current and preventing the full magnitude of available short-circuit current from flowing in said circuit; each pole of said protective device being comprised of series connected time delay trip unit, instantaneous trip unit, current limiting device and a pair of cooperating contacts; an arc chute associated with each pair of cooperating contacts; operating means for simultaneously controlling all pairs of cooperating contacts for snap open and snap close operation; said trip units and said current limiting devices mechanically coordinated to operate said operating means; said time delay trip unit operative on the occurrence of an over-load current below a first predetermined current magnitude; said instantaneous trip unit operative on the occurrence of fault current above said first predetermined current magnitude and below a cross-over point; said current limiting device having said cross-over point with respect to said instantaneous trip unit whereby currents above said cross-over value are limited and interrupted by said current limiting device, a visually observable means associated with each of said current limiting fuses; said visually observable means of each of said current limiting fuses being moved to a perceivable position responsive to operation of their said respective current limiting fuse to thereby indicate the phase which conducted fault current, said current limiting device operative to prevent the re-closing of said protective device when the fusible element within said current limiting device is ruptured, inability to close said protective device immediately after circuit interruption but able to close said protective device after a short delay serving as an indication that said protective device opened as a result of said time delay trip unit.

8. A low voltage, high current molded case multipole circuit protective device for protecting a circuit on the occurrence of all magnitudes of fault current and preventing the full magnitude of available short-circuit current from flowing in said circuit; each pole of said protective device being comprised of series connected time delay trip unit, instantaneous trip unit, current limiting device and a pair of cooperating contacts; an arc chute associated with each pair of cooperating contacts; operating means for simultaneously controlling all pairs of cooperating contacts for snap open and snap close operation; said trip units and said current limiting devices mechanically coordinated to operate said operating means; said time delay trip unit operative on the occurrence of an over-load current below a first predetermined current magnitude; said instantaneous trip unit operative on the occurrence of fault current above said first predetermined current magnitude and below a cross-over point; said current limiting device having said cross-over point with respect to said instantaneous trip unit whereby currents above said cross-over value are limited and interrupted by said current limiting device, a visually observable means associated with each of said current limiting fuses; said visually observable means of each of said current limiting fuses being moved to a perceivable position responsive to operation of their said respective current limiting fuse to thereby indicate the phase which conducted fault current, said current limiting device operative to prevent the re-closing of said protective device when the fusible element within said current limiting device is ruptured, manual re-closing of said protective device immediately following circuit interruption indicating said protective device was opened as a result of current magnitude between the cross-over of said time delay and instantaneous trip unit and the cross-over between said instantaneous trip unit and said current limiting device.

9. A low voltage, high current molded case multipole circuit protective device for protecting a circuit on the occurrence of all magnitudes of fault current and preventing the full magnitude of available short-circuit current from flowing in said circuit; each pole of said protective device being comprised of series connected time delay trip unit, instantaneous trip unit, current limiting device and a pair of cooperating contacts; an arc chute associated with each pair of cooperating contacts; operating means for simultaneously controlling all pairs of cooperating contacts for snap open and snap close operation; said trip units and said current limiting devices mechanically coordinated to operate said operating means; said time delay trip unit operative on the occurrence of an over-load current below a first predetermined current magnitude; said instantaneous trip unit operative on the the occurrence of fault current above said first predetermined current magnitude and below a cross-over point; said current limiting device having said cross-over point with respect to said instantaneous trip unit whereby currents above said cross-over value are limited and interrupted by said current limiting device, a visually observable means associated with each of said current limiting fuses; said visually observable means of each of said current limiting fuses being moved to a perceivable position responsive to operation of their said respective current limiting fuse to thereby indicate the phase which conducted fault current, said current limiting device operative to prevent the re-closing of said protective device when the fusible element within said current limiting device is ruptured, inability to close said protective device immediately after circuit interruption but able to close said protective device after a short delay serving as an indication that said protective device opened as a result of said time delay trip unit, manual re-closing of said protective device immediately following circuit interruption indicating said protective device was opened as a result of current magnitude between the cross-over of said time delay and instantaneous trip unit and the cross-over between said instantaneous trip unit and said current limiting device.

10. A low voltage, high current molded case multipole circuit protective device for protecting a circuit on the occurrence of all magnitudes of fault current and preventing the full magnitude of available short-circuit current from flowing in said circuit; each pole of said protective device being comprised of series connected time delay trip unit, instantaneous trip unit, current limiting device and a pair of cooperating contacts; an arc chute associated with each pair of cooperating contacts; operating means for simultaneously controlling all pairs of cooperating contacts for snap open and snap close operation; said trip units and said current limiting devices mechanically coordinated to operate said operating means; said time delay trip unit operative on the occurrence of an over-load current below a first predetermined current magnitude; said instantaneous trip unit operative on the occurrence of fault current above said first predetermined current magnitude and below a cross-over point; said current limiting device having said cross-over point with respect to said instantaneous trip unit whereby currents above said cross-over value are limited and interrupted by said current limiting device, a visually observable means associated with each of said current limiting fuses; said visually observable means of each of said current limiting fuses being moved to a perceivable position responsive to operation of their said respective current limiting fuse to thereby indicate the phase which conducted fault current, said current limiting device operative to prevent the re-closing of said protective device when the fusible element within said current limiting device is ruptured, said current limiting device being removable and replaceable, said pairs of cooperating contacts serving as a disconnect switch to permit removal and replacement of said current limiting device without injury to personnel.

11. A multipole protective device containing a first, second and third trip element, a pair of cooperating contacts and an arc chute for each pole; said first, second and third trip elements, as well as said pairs of cooperating contacts being connected in electrical series with each other for each pole of said multipole protective device, a first cross-over between said first and second trip element; a second cross-over point between said second and third trip element; each of said first, second and third trip elements operative to effect simultaneous operation of said pair of cooperating contacts on the occurrence of predetermined conditions; said third trip element being comprised of a current limiting device effective to limit and interrupt currents above said second cross-over point, said protective device designed to withstand maximum thermal and magnetic stress below the value of those which would be set up in the absence of said current limiting device, a visually observable means associated with each of said third trip elements; said visually observable means of each of said third trip elements being moved to a perceivable position responsive to operation of their said respective third trip element; said third trip element serving as an indicator of the range of fault current which resulted in operation of said protective device, said first, second and third trip elements, as well as said pairs of cooperating contacts being positioned with a common enclosure to thereby form a unitary multipole protective device.

12. In a low voltage, high current multipole circuit interrupter comprised of a plurality of poles each of which has a pair of cooperating contacts with an engaged and disengaged position and a current limiting device; an operating mechanism for simultaneously operating said plurality of pairs of cooperating contacts from and to both said engaged position and said disengaged position; each of said plurality of poles also having a bimetal and magnetic trip means connected in electrical series with said cooperating contacts and said current limiting device; a said current limiting device electrically and mechanically associated with each pole of said circuit breaker; each of said current limiting devices having a spring biased striker pin normally held in inoperative position; said bimetal trip means effective to initiate opening operation of all pairs of said cooperating contacts on the occurrence of an abnormal current condition which is above the magnitude of load current and below a first predetermined magnitude; said magnetic trip means effective initiate opening operation of all pairs of said cooperating contacts on the occurrence of an abnormal current condition above said first predetermined current magnitude and below a second predetermined current magnitude; said current limiting device effective to interrupt all abnormal current conditions above said second predetermined magnitude; said striker pin of said current limiting device rendered operative when said current limiting devices interrupts abnormal currents above said second predetermined magnitude to initiate simultaneous opening of all pairs of said cooperating contacts; said plurality of cooperating contacts, said operating mechanism, said time delay trip means, said magnetic trip means and said current limiting devices being mounted on and contained within housing means to thereby form an integrated unit comprising said low voltage, high current, multi-pole circuit interrupter.

13. A low voltage, high current circuit protective device for a circuit designed for maximum thermal and magnetic stresses below the magnitude of the available short-circuit current of said circuit; said protective device having three poles each of which is comprised of a current limiting device, a first and second trip unit, and a pair of cooperating contacts with an engaged and disengaged position; an operating mechanism to simultaneously selectively operate said pairs of cooperating contacts to both said engaged and said disengaged position; each of said first trip means operative to initiate trip operation through said operating mechanism on the occurrence of a fault current above load current and below a first predetermined current magnitude; each of said second trip means operative to initiate trip operation through said operating mechanism on the occurrence of a fault current above said first predetermined current magnitude and below a second predetermined current magnitude; each of said current limiting devices being effective to interrupt current magnitudes above said second predetermined current magnitude; each of said current limiting devices having a spring biased striker pin to initiate simultaneous operation of said pairs of cooperating contacts through said operating mechanism; said striker pin being operatively positioned to operate said operating mechanism on the occurrence of a fault current above said first predetermined current magnitude; said cooperating contacts, said operating mechanism, said first trip means, said second trip means and said current limiting device all contained within a molded case enclosure to thereby form a unitary circuit protective device.

14. In a circuit interrupter for low voltage, high current application having a plurality of poles each of which has a pair of cooperating contacts with an engaged and disengaged position; an operating mechanism for simultaneously operating said plurality of pairs of cooperating contacts from and to said engaged position and said disengaged position; said circuit interrupter having a time delay and magnetic trip means associated with each of said poles; a current limiting device electrically and mechanically associated with each pole of said circuit interrupter; each of said current limiting devices having a spring biased striker pin normally held in inoperative position; each of said time delay trip means effective to initiate opening operation of all pairs of said cooperating contacts on the occurrence of an over load current above load current and below a first predetermined magnitude; each of said magnetic trip means effective to initiate opening operation of all pairs of said cooperating contacts on the occurrence of a fault current above said first predetermined current magnitude and below a second predetermined current magnitude; each of said current limiting devices effective to interrupt short-circuit currents above said second predetermined magnitude; said striker pin of said current limiting device rendered operative on the occurrence of a short-circuit current above said predetermined magnitude to initiate simultaneous opening of all pairs of said cooperating contacts; said plurality of cooperating contacts, said operating mechanism, said time delay trip means, said magnetic trip means and said current limiting devices all being contained within a common molded case enclosure to thereby form a complete circuit interrupter.

15. In a circuit interrupter comprised of a plurality of poles each of which has a pair of cooperating contacts with an engaged and disengaged position; an operating mechanism for selectively simultaneously operating said plurality of pairs of cooperating contacts to said engaged position and said disengaged position; said circuit interrupter having a time delay and magnetic trip means associated with each of said poles; a current limiting device being electrically and mechanically associated with each pole of said circuit interrupter; each of said current limiting devices having a spring biased striker pin normally held in inoperative position; each of said time delay trip means being effective to initiate opening operation of said circuit interrupter on the occurrence of an overload current above load current and below a first predetermined current magnitude; each of said magnetic trip means being effective to initiate opening operation of said circuit interrupter on the occurrence of a fault current above said first predetermined current magnitude and below a second predetermined current magnitude; each of said current limiting devices being effective to interrupt short-circuit currents above said second predetermined current magnitude; said striker pin of said current limiting device rendered operative on the occurrence of a short-circuit above said second predetermined current magnitude to initiate simultaneous opening of all poles of said circuit interrupter, said circuit interrupter having a tripper bar common to all poles to control the operation of said operating mechanism; spring means controlling the operation of said tripper bar; each of said magnetic trip means being operatively connected to said tripper bar; each of said time delay trip means and each of said current limiting devices being operatively connected to said spring means to thereby control said tripper bar.

16. In a circuit interrupter comprised of a plurality of poles each of which has a pair of cooperating contacts with an engaged and disengaged position; an operating mechanism for selectively simultaneously operating said plurality of pairs of cooperating contacts to said engaged position and said disengaged position; said circuit interrupter having a time delay and magnetic trip means associated with each of said poles; a current limiting device being electrically and mechanically associated with each pole of said circuit interrupter; each of said current limiting devices having a spring biased striker pin normally held in inoperative position; each of said time delay trip means being effective to initiate opening operation of said circuit interrupter on the occurrence of an overload current above load current and below a first predetermined current magnitude; each of said magnetic trip means being effective to initiate opening operation of said circuit interrupter on the occurrence of a fault current above said first predetermined current magnitude and below a second predetermined current magnitude; each of said current limiting devices being effective to interrupt short-circuit currents above said second predetermined current magnitude; said striker pin of said current limiting device rendered operative on the occurrence of a short-circuit above said second predetermined current magnitude to initiate simultaneous opening of all poles of said circuit interrupter, said circuit interrupter having a tripper bar common to all poles to control the operation of said operating mechanism; spring means controlling the operation of said tripper bar; each of said magnetic trip means being operatively connected to said tripper bar; a latch means to render said spring means inoperative, each of said time delay trip means and each of said current limiting devices being operatively connected to said latch means to thereby control the said spring means.

17. In a circuit interrupter comprised of a plurality of poles each of which has a pair of cooperating contacts with an engaged and disengaged position; an operating mechanism for selectively simultaneously operating said plurality of pairs of cooperating contacts to said engaged position and said disengaged position; said circuit interrupter having a time delay and magnetic trip means associated with each of said poles; a current limiting device being electrically and mechanically associated with each pole of said circuit interrupter; each of said current limiting devices having a spring biased striker pin normally held in inoperative position; each of said time delay trip means being effective to initiate opening operation of said circuit interrupter on the occurrence of an overload current above load current and below a first predetermined current magnitude; each of said magnetic trip means being effective to initiate opening operation of said circuit interrupter on the occurrence of a fault current above said first predetermined current magnitude and below a second predetermined current magnitude; each of said current limiting devices being effective to interrupt short-circuit currents above said second predetermined current magnitude; said striker pin of said current limiting device rendered operative on the occurrence of a short-circuit above said second predetermined current magnitude to initiate simultaneous opening of all poles of said circuit interrupter, said circuit interrupter having a tripper bar common to all poles to control the operation of said operating mechanism; spring means controlling the operation of said tripper bar; each of said magnetic trip means being operatively connected to said tripper bar; a latch means to normally render said spring means inoperative; a pivotally mounted member operatively positioned to operate said latch; each of said current limiting devices being operatively positioned to release said latch through said pivotally mounted member on the occurrence of a short-circuit above said second predetermined current magnitude; each of said time delay trip means being operatively positioned to release said latch on the occurrence of an over-load current below said second predetermined current magnitude.

18. A low voltage high current multiple pole circuit protective device comprised of pairs of cooperating contacts, current limiting devices, time delay bimetallic trip units, and instantaneous magnetic trip units; an operating mechanism for simultaneous operation to snap open and snap close said cooperating contacts of said circuit protective device; one of said current limiting devices, time delay bimetallic trip units, instantaneous magnetic trip units and pair of cooperating contacts being positioned in each pole of said protective device and connected in electrical series with each other, said time delay bimetallic trip units, said instantaneous magnetic trip units and said current limiting devices being operatively positioned and operatively connected to said operating mechanism to effect simultaneous snap open operation of said pairs of cooperating contacts; said trip units and said current limiting devices being electrically coordinated wherein said time delay bimetallic trip units are operative for current values above load current and below a first predetermined current magnitude, said instantaneous magnetic trip units are operative for current values above said first predetermined current magnitude and below a second predetermined current magnitude and said current limiting devices are operative for current values above said second predetermined current magnitude, said current limiting devices constructed to interrupt current values above said second predetermined value and mechanically coordinate with said operating mechanism; a spring means being normally held inoperative by a latch means, said time delay trip units and said current limiting devices being operatively connected through said latch to said spring means to control a tripper bar associated with said operating mechanism for simultaneous operation of said pairs of cooperating contacts, said magnetic trip elements being operatively connected to said tripper bar for simultaneous operation of said pairs of said cooperating contacts.

19. In combination a substantially rectangular frame structure of insulating material; an automatic circuit interrupter supported by said frame structure; said interrupter including normally closed separable contact means spring biased to the open position thereof and overload responsive tripping means adapted to carry current; a current-limiting fuse adapted to blow only upon occurrence of major fault currents backing-up said interrupter also mounted on said frame structure; striker pin means supported by said fuse and controlled by a fusible shunt across said fuse to trip said interrupter upon blowing of said fuse; a pair of electrical connectors arranged on and supported by said frame structure each adjacent to one of two parallel sides thereof for connecting said interrupter into an electric circuit; a first conductor means for conductively connecting one of said separable contact means to one of said pair of connectors; a second conductor means for conductively connecting another of said separable contact means to the other of said pair of connectors, said second conductor means including said overload responsive tripping means and said fuse; and said overload responsive tripping means and said fuse being arranged on said frame structure within a space bounded on one side by said separable contact means and on the other side by said other of said pair of connectors.

20. In combination a frame structure of insulating material; an automatic circuit interrupter mounted on said frame structure, said interrupter including separable contact means, spring means biasing said contact means to the open position thereof, a trip-free latch mechanism normally restraining said contact means in the closed position thereof, said latch mechanism comprising a latch lever normally held in position by latch friction and movable out of position against the action of a predetermined spring bias thereby unlatching said latch mechanism, thermally responsive tripping means arranged to cause unlatching of said latch mechanism upon occurrence of an overload, a handle adapted for manual operation of said contact means with said latch mechanism in latched position, and means providing for a positive coupling between said handle and said latch mechanism to permit resetting of said latch mechanism by operation of said handle; a current-limiting fuse for backing-up said interrupter mounted on said frame structure; striker pin means supported by said fuse and controlled by a fusible shunt across said fuse to trip said interrupter upon blowing of said fuse and fusion of said shunt, said striker pin means including a striker-pin-biasing spring and a striker pin proper arranged to strike against said latch lever of said latch mechanism under the action of said striker-pin-biasing spring; and said striker-pin-biasing spring having a stronger action than the action of said predetermined spring bias of said latch lever to preclude resetting of said latch mechanism by operation of said handle upon operation of said striker pin means.

21. In combination a substantially rectangular frame structure of insulating material; an automatic circuit interrupter supported by said frame structure, said interrupter including separable contact means, spring means biasing said contact means to the open position thereof, a trip-free latch mechanism normally restraining said contact means in the closed position thereof, said latch mechanism having a latch lever normally held in position by latch friction and movable out of position against the action of a predetermined spring bias thereby unlatching said latch mechanism, thermally responsive tripping means adapted to be heated by current to cause unlatching of said latch mechanism upon occurrence of an overload, a handle adapted for manual operation of said contact means with said latch mechanism in latched position, and means providing for a positive coupling between said handle and said latch mechanism to permit resetting of said latch mechanism by operation of said handle upon operation of said thermally responsive tripping means; a current-limiting fuse backing-up said circuit interrupter supported by said frame structure; striker pin means supported by said fuse and controlled by a fusible shunt across said fuse to become effective upon blowing of said fuse, said striker pin means including a striker-pin-biasing spring and a striker pin proper arranged to strike against said latch lever of said latch mechanism under the action of said striker-pin-biasing spring, said striker-pin-biasing spring having a stronger action that the action of said predetermined spring bias of said latch lever of said latch mechanism to preclude resetting of said latch mechanism by the action of said handle upon operation of said striker pin means; a pair of electrical connectors arranged on and supported by said frame structure each adjacent to one of two parallel sides thereof for connecting said circuit interrupter into an electric circuit; a first conductor means for conductively connecting one of said separable contact means to one of said pair of connectors; a second conductor means for conductively connecting another of said separable contact means to the other of said pair of connectors, and said second conductor means including said thermally responsive tripping means and said fuse.

22. In combination a substantially rectangular frame structure of insulating material; an automatic circuit interrupter mounted on said frame structure, said interrupter including separable contact means, spring means biasing said contact means to the open position thereof, a trip-free latch mechanism having a trip-shaft and a rocking latch element mounted on said trip-shaft, an overload tripping device including a normally flat bimetal strip arranged in a plane parallel to said trip-shaft, means associated with said bimetal strip for normally restraining said latch element in the latched position of said latch mechanism, a handle adapted for manual operation of said contact means with said latch mechanism in latched position, and means providing for a positive coupling between said handle and said latch mechanism when unlatched to permit resetting thereof by operation of said handle; a current-limiting backup fuse for said interrupter mounted on said frame structure; striker pin means forming an integral part of said fuse and controlled by a fusible shunt across said fuse to become effective upon fusion of said shunt, said striker pin means including a striker-pin-biasing spring and a striker pin proper arranged at right angles to said trip-shaft to unlatch said latching mechanism upon fusion of said shunt; a pair of electrical connectors mounted on said frame structure each adjacent to one of two parallel sides thereof for connecting said interrupter into an electric circuit; a first conductor means for conductively connecting one of said separable contact means to one of said pair of connectors; a second conductor means for conductively connecting another of said separable contact means to the other of said pair of connectors, and said second conductor means including said bimetal strip and said fuse.

23. In combination a frame structure of insulating material, an automatic circuit interrupter supported by said frame structure, said interrupter comprising a pair of separable contacts spring biased to the open position thereof, overload tripping means, and a manual operating mechanism for one of said pair of contacts including a handle and a trip-free latch mechanism permitting said handle to assume an off-position, an on-position and an intermediate position indicative of unlatching of said latch mechanism; a current-limiting fuse for backing-up said interrupter supported by said frame structure; a striker pin controlled by a fusible shunt across said fuse operative upon blowing of said fuse and fusion of said shunt; and means jointly responsive to operation of said tripping means and to operation of said striker pin to unlatch said latch mechanism to cause said handle to be moved to said intermediate position both in response to operation of said tripping means and in response to operation of said striker pin.

24. In combination a frame structure of insulating material, an automatic circuit interrupter mounted on said frame structure, said interrupter comprising fixed contact means and movable contact means spring biased to the open position thereof, a bimetallic strip forming an overload tripping means, and a manual operating mechanism for said movable contact means including a handle and a trip-free latch mechanism permitting said handle to assume an off-position, an on-position and an intermediate position indicative of unlatching of said latch mechanism; a current-limiting fuse for backing up said interrupter also mounted on said frame structure; a striker pin controlled by a fusible shunt across said fuse operative upon blowing of said fuse and fusion of said shunt, said striker pin being arranged with the striking tip thereof adjacent the plane of said bimetallic strip substantially at right angles thereto; and means situated adjacent to said bimetallic strip and adjacent to said striking tip of said striker pin jointly responsive to operation of said bimetallic strip and to operation of said striker pin to unlatch said latch mechanism to cause handle to be moved to said intermediate position to indicate operation of said bimetallic strip as well as blowing of said fuse.

References Cited in the file of this patent

UNITED STATES PATENTS

| | | |
|---|---|---|
| 1,192,974 | Anderson | Aug. 1, 1916 |
| 2,050,285 | Dorfman | Aug. 11, 1936 |
| 2,144,501 | Lingal | Jan. 17, 1939 |
| 2,162,343 | Brace | June 13, 1939 |
| 2,294,838 | Dorfman | Sept. 1, 1942 |
| 2,330,690 | Dannenberg | Sept. 28, 1943 |
| 2,376,789 | Leonard | May 22, 1945 |
| 2,405,929 | Wald | Aug. 13, 1946 |
| 2,421,853 | Scott | June 10, 1947 |
| 2,473,196 | Dannenberg | June 14, 1949 |
| 2,548,617 | Purpura | Apr. 10, 1951 |
| 2,574,093 | Edmunds | Nov. 6, 1951 |
| 2,583,174 | Hart | Jan. 22, 1952 |
| 2,592,399 | Edsall et al. | Apr. 8, 1952 |
| 2,843,702 | Edmunds | July 15, 1958 |

FOREIGN PATENTS

| | | |
|---|---|---|
| 225,563 | Great Britain | May 28, 1925 |
| 434,618 | Germany | Sept. 29, 1926 |